No. 726,011. PATENTED APR. 21, 1903.
H. F. ALVERSON.
GATE FOR WIRE FENCES.
APPLICATION FILED DEC. 12, 1901.

NO MODEL.

WITNESSES:
F. J. Larson.
E. A. Sprecher.

INVENTOR:
Harry F. Alverson
PER. Geo. W. Tule.
ATTORNEY.

UNITED STATES PATENT OFFICE.

HARRY F. ALVERSON, OF OMAHA, NEBRASKA.

GATE FOR WIRE FENCES.

SPECIFICATION forming part of Letters Patent No. 726,011, dated April 21, 1903.

Application filed December 12, 1901. Serial No. 85,555. (No model.)

*To all whom it may concern:*

Be it known that I, HARRY F. ALVERSON, residing at 2323 South Eighteenth street, Omaha, in the county of Douglas and State of Nebraska, have invented certain useful Improvements in Gates for Wire Fences; and I do hereby declare that the following is a full, clear, and exact description of the invention, such as will enable others skilled in the art to which it appertains to make and use the same, reference being had to the accompanying drawings, which form a part of this specification.

This invention relates to an improvement in gates for wire fences.

The aim of my invention is to provide a gate that may be inserted within and form part of a wire fence, as will be described more fully hereinafter.

Figure 1:
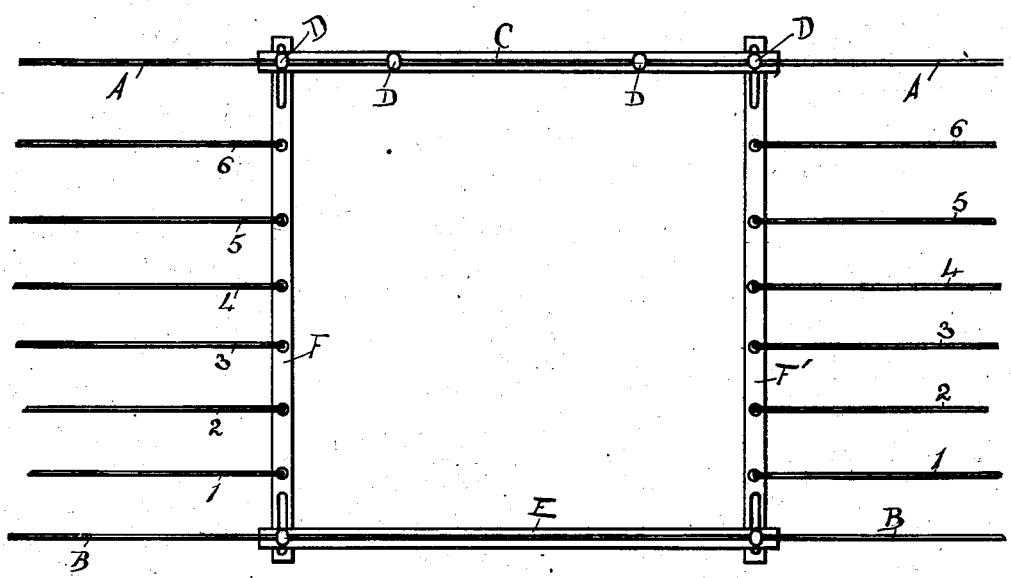
Figure 2:
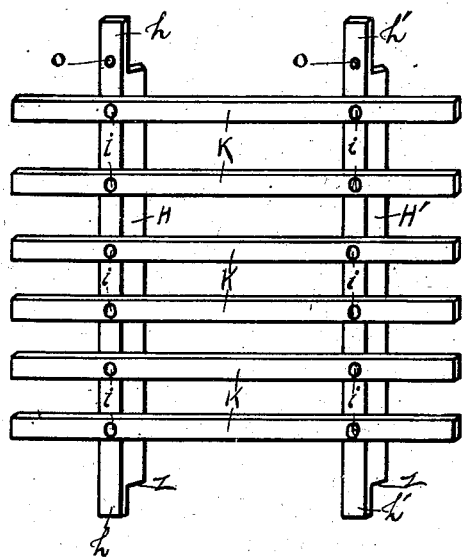
Figure 3:
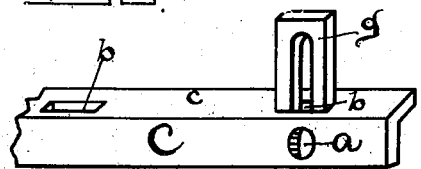
Figure 4:
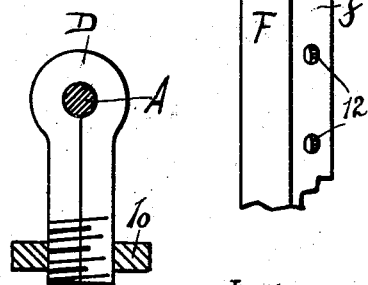

In the accompanying drawings I have shown, in Figure 1, an eight-strand wire fence provided with one of my insertible gate-frames with the gate removed. Fig. 2 shows a detached detail of the gate. Fig. 3 discloses the manner of uniting the gate-frame members. Fig. 4 discloses one of the holders used in securing the horizontal gate-frame members to the supporting-fence strand.

In the use of wire fences on the farm, ranch, and other places it is often highly desirable to provide a gate, so that sheep, hogs, and other animals may be driven from one inclosure into another.

To provide a gate that may be inserted within an ordinary wire fence or wire-fence fabric, I construct an adjustable gate-frame which I insert within the fence fabric so that the gate-frame and the gate proper become a portion of the fence fabric.

In referring to Fig. 1 I have shown an eight-strand wire fence comprising the upper strand A, the lower B, and the intermediate strands 1, 2, 3, 4, 5, and 6. Secured to the upper strand A is the horizontal member C of my gate-frame, which is preferably made of so-called "angle-iron." In Fig. 3 I have shown a broken portion of this upper frame member C. The vertical side of this angle-iron frame member is provided with a plurality of round openings $a$, through which extend the supporting ears or holders D, while the horizontal member $c$ of this upper gate-frame is provided with a plurality of square openings $b$. The lower counterpart horizontal gate-frame member E is constructed exactly like the upper member, but simply being provided with circular end openings $a$ and with rectangular slots $b$ on the other side, registering with the openings $b$ within the upper member C. These frame members C and E are both provided with similar slots $b$, and the extensions $h$ and $h'$ both work within said slots. These upper and lower horizontal frame members C and E are secured to the upper and lower fence-strands A and B, to which the gate is to be secured. This is accomplished by using a split ear or holder D in the form of a so-called "eyelet," through which passes the supporting fence-strand, while secured to the holder is an ordinary nut 10, as is disclosed in Fig. 4. These holders neatly work through the openings $a$, so that the upper and lower gate-frame members C and E may be tightly secured to the upper and lower fence-strands to which the insertible gate is to be secured. At a suitable point the intermediate fence-strands 1, 2, 3, 4, 5, and 6 are severed, when one of the counterpart vertical gate-frame members F and F' is secured to the upper and lower gate-frame members C E. These counterpart side frame members F F' have a portion of their flanges removed, so as to provide the narrow extension $g$, as is shown in Fig. 3, adapted to nicely work through the terminal slots $b$ within the upper and lower gate-frame members. This extension $g$ is slotted at $x$, as will be noticed in referring to Fig. 3. After the upper and lower gate-frame members have been secured by one or more of the ears D the ends of the frame members F and F' are inserted through the end slots $b$, and locked by means of one of the holders D, so that a rectangular gate-frame is provided composed of the two counterpart horizontal gate-frame members C and E and the two vertical gate members F and F'. By means of the slot $x$ within the extensions $g$ the upper and lower gate-frame members C and E may be brought nearer or farther away from one another, so as to register with the lower and upper fence-wires A and B. After these side gate-frame members have been inserted the intermediate fence-wires, as 1 2 3, &c., are secured to the vertical gate-frame members F and F' in passing the wires through the openings 12 within the portions $f$ of the frame members, as will be understood in referring to Figs. 1 and 3.

I do not wish to confine myself to the placing of the openings 12 within any particular side of the frame members F and F', as either side may be perforated to receive the fence-wires. In Fig. 1, for instance, the openings are within the front plate, while, if desired, the openings may be placed within the portion $f$, as is shown in Fig. 3, when the wires are passed through the same.

In connection with my gate-frame I use a gate comprising the vertical members H and H', of angle-iron, provided with the upper and lower extensions $h$ and $h'$, which work within the end slots $b$ within the horizontal gate members, so that the gate may be readily inserted within the frame. The vertical members H are provided with a plurality of horizontal bars K to form the gate proper, as is shown in Fig. 2. These horizontal gate members K may correspond in number to the number of wire strands in the fence. The upper extending portions $h$ $h$ are provided with suitable openings O, through which a cotter-pin may be passed to lock the gate within the frame. Below the gate rests upon the shoulders $z$ $z$, as disclosed in Fig. 2. By this means a neat gate may be provided within the fence at any point without the insertion of any posts, and it may be inserted without much cost, and,

Having thus described my said invention, what I claim as new, and desire to secure by United States Letters Patent, is—

1. The combination with a wire fence comprising a plurality of superposed wires, of a horizontal gate-frame member secured to the uppermost wire and provided with a plurality of openings and slots, a lower horizontal gate-frame member provided with a plurality of openings and slots secured to the lowermost wire, two counterpart vertical side gate-frame members having their ends above and below slotted and extending through the slots within aforesaid horizontal members, a plurality of holders extending through aforesaid openings within said horizontal frames to encompass aforesaid wires to secure said horizontal gate-frame members to said fence-wires, holders extending through aforesaid top and bottom gate-frame members and through the slots within said counterpart side gate-frame members, to unite said frame members, and a gate removably held within said top and bottom gate-frame members as and for the purpose set forth.

2. A gate-frame for wire fences comprising the upper horizontal frame member made of angle-iron, the horizontal web of which is provided with a plurality of openings, a counterpart lower horizontal gate-frame member made of angle-iron, the horizontal portion of which is also provided with openings, holders adapted to be secured to said horizontal gate-frame members so that the same may be secured to the upper and lower strands of a suitable wire fence, two counterpart vertical gate-frame members the upper and lower ends of which have a portion of the flange removed to provide the narrow extension $g$, which is slotted as is shown at $x$, keepers adjusted to pass through said slots $x$ and openings $a$ and secured to the upper and lower fence-strands to unite said gate-frame members as and for the purpose set forth.

HARRY F. ALVERSON.

In presence of—
GEORGE W. SUES,
FREDERICK J. LARSON.